UNITED STATES PATENT OFFICE

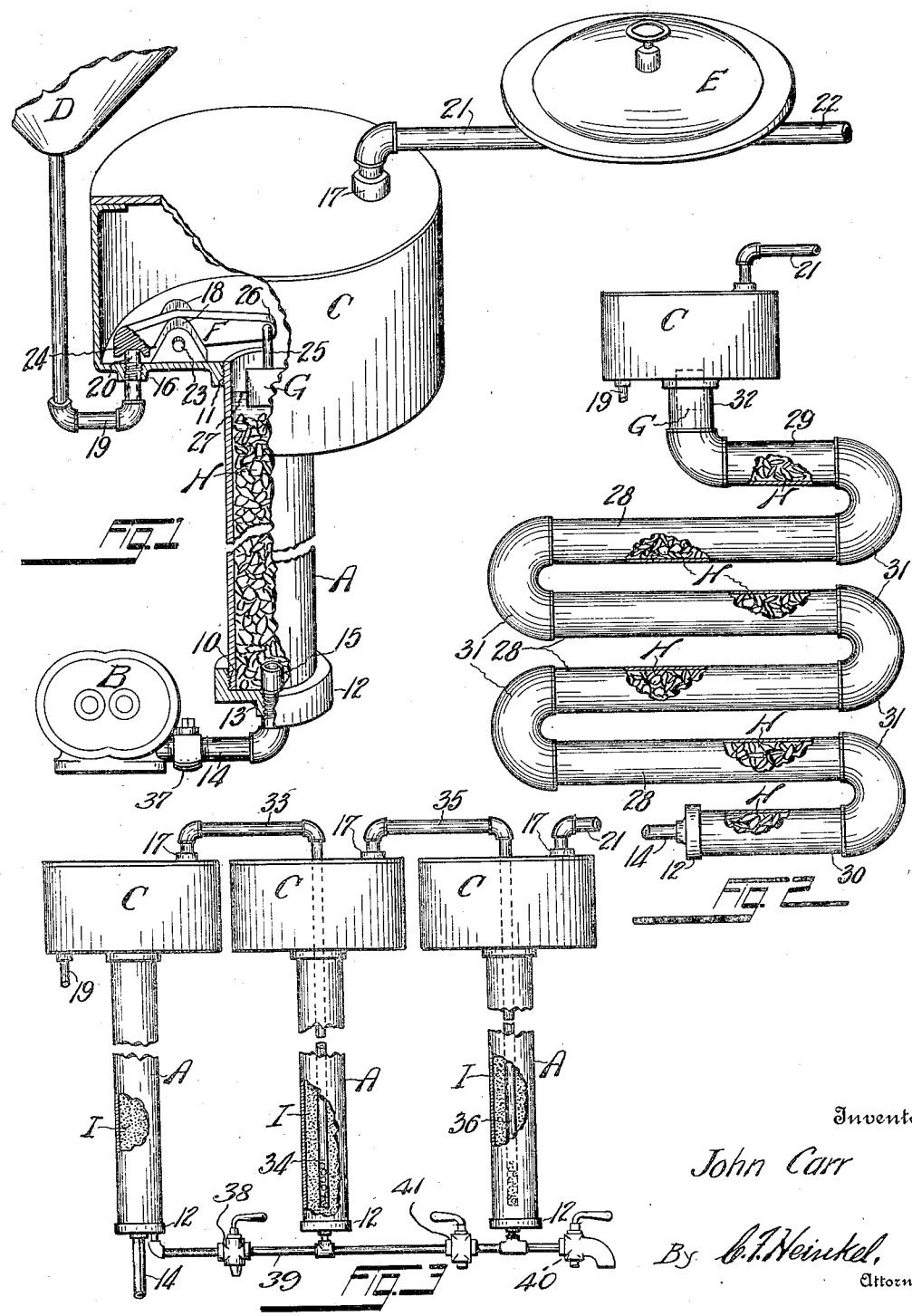

JOHN CARR, OF CLEVELAND, OHIO, ASSIGNOR OF ONE-EIGHTH TO CHRISTIAN G. KAUHL AND ONE-EIGHTH TO NORMAN A. PAGE, BOTH OF EAST CLEVELAND, OHIO; GEORGE H. FOERLER EXECUTOR OF SAID JOHN CARR, DECEASED

CARBURATION APPARATUS

Application filed July 6, 1926. Serial No. 120,648.

My invention relates to means of carburation generally and more particularly to means of mixing air and a volatile substance to form a gas.

The predominating objects of my invention are:—a simple means of carburation; efficient in operation; easily operable; easily installed; economical of construction; economical of upkeep; economical of operation; and efficient in gasifying properties. Other objects will appear, or become obvious, during the following description of the apparatus shown in the accompanying drawing.

In order to set forth my invention clearly, I will describe herein one particular method of carburation and have illustrated a certain device or apparatus in the accompanying drawing mentioned, in the present instance an apparatus for mixing air and gasoline to form a gas, and will describe this apparatus particularly and as related to the particular method mentioned.

It is to be understood that this illustration and description does not limit my invention to the particular structure and method so shown and described and that various modifications may be made in the structure of the elements as well as in the relations and combinations thereof within the scope of the appended claims.

Generally speaking, my invention makes use of baffle means but such baffle means are not such means as mineral wool and the like which really do not baffle, nor such means as plates and the like which are fixed in position, but the baffle means I do use is a material loosely and, preferably promiscuously assembled which offers baffle faces in various directions and in various planes. The baffle means which I use is a baffle material, preferably granular, and is also porous to some extent such as gravel or sand. It is not absolutely necessary that this material be porous since glass and the like may be used; this material may be less porous than the stone-like gravel or sand since iron or other metal may be used.

For the sake of avoiding the repeated description of this material or baffle means or baffle material, I will use the term "deflective-surface-material" in this specification as well as in the appended claims and mean thereby the various materials which offer a variety of baffle faces in various planes and which are either porous or not.

In the accompanying drawing mentioned:—

Fig. 1 is a general perspective view of a single unit carburation device to form a gas from air and gasoline, embodying the features of my invention, and shows one container disposed vertically and has a portion broken away to show the interior.

Fig. 2 is a side view of a carburation device for air and gasoline, embodying the features of my invention, and shows a plurality of containers arranged horizontally and substantially parallel with each other and has portions broken away to show the interior thereof.

Fig. 3 is a side view of a carburation device for air and gasoline, embodying the features of my invention and shows a plurality of vertically disposed containers, similar to the one shown in Fig. 1, as arranged side by side and one manner of connecting them to each other and has portions broken away to show the interior thereof.

Similar reference characters refer to similar parts throughout the views.

Referring now particularly to Fig. 1 of the drawing:

In this instance, the container A is a round tube externally threaded at the ends 10 and 11.

The cap 12 is screwed onto the end 10 and has the boss 13 into which the pipe 14 is threaded. The end 15 of the pipe 14 extends a short distance up into the interior of the container A. The pipe 14 leads to and is connected to a source of air which is to be carbureted; as the pump B for instance.

The drum C is screwed onto the end 11 of the container A and has the bosses 16 and 17 on the outside thereof and the ears 18 on the inside thereof in proper relation to the container A.

The pipe 19 is threaded into the boss 16 and the end 20 thereof extends a short distance up into the interior of the drum C. The pipe 19 leads to the tank D containing the carbureting material; gasoline in the present instance.

The pipe 21 is threaded into the boss 17 and leads to the pressure regulator E which has the gas outlet 22.

The lever F is fulcrumed on the pin 23, between the ears 18, and has the cup-shaped end 24 extending over the valve-shaped end of the end 20 to form a valve arrangement between the inner end of the pipe 19 and the interior of the drum C. The upper end of the rod 25 is hinged to the end 26 of the lever F and the lower end of the rod 25 carries the float G which extends freely into the upper end of the container A. Any other sort of float and valve arrangement may be used.

In the present instance, the deflective-surface-material in the container A is the gravel H which is promiscuously placed into the container.

The granules of the gravel H each have substantial surfaces of various forms and lying in various planes and variously sized and variously disposed pockets and spaces are formed between the various surfaces of the granules when the gravel is deposited in the container.

When gasoline is fed through the pipe 19, the pockets and the spaces between the granules are filled with gasoline and some of this gasoline soaks into gravel granules since they are stone-like and somewhat porous. When the flow of the gasoline has continued until the gasoline has reached the level 27, the float closes the valve on the end of the pipe 19, as shown in the drawing, and thereby arrests the further flow of gasoline into the container. When the level of the gasoline recedes below normal, the float G recedes with it, or in other words, drops downwardly in the container, and thereby opens the valve at the end 20 and keeps it open until the gasoline is again at normal level.

When gasoline is present in the container A, the pump B is started whereupon a current of air is forced through the pipe 14 and into the interior of the container A.

Due to the baffle means in the container, this air current is directed into a sort of circulatory movement within the container but this movement is not regular since the various forms and angles and planes of the faces of the granules direct this circulation into various directions and thereby causes an uneven circulation of the air and consequent better and quicker breaking up and gasifying of the gasoline.

The porous nature of the material H also aids greatly in washing the gas.

When the gas is formed, it collects in the drum C and passes to the reducer E from where it can be drawn at whatever pressure the reducer is set to.

With this arrangement, it is practically impossible to deliver solid gasoline through the pipe 21 since any gasoline which is not thoroughly gasified will automatically return to the container due to gravity.

Referring now particularly to Fig. 2 of the drawing:

In this instance, the container is formed by a series of round tubes 28 disposed horizontally and substantially parallel with each other and the upper tube 29 and the lower tube 30; all connected together by the U couplings 31 as shown.

The neck 32 connects the end of the tube 29 with the drum C similar to the drum in Fig. 1. The float and lever and valve arrangement, similar to that shown in Fig. 1, is disposed in the neck 32 and the drum C.

The cap 12, similar to the cap 12 in Fig. 1, closes the end of the tube 30. The elements not specifically mentioned are similar to those of Fig. 1 and are for a similar purpose.

This arrangement provides a longer path for the air passing through the container but otherwise operates in the same general manner as the apparatus shown in Fig. 1. This arrangement permits of a long gasifying passage with a minimum amount of space required for the apparatus.

Referring now particularly to Fig. 3 of the drawing:

In this instance, three containers A, similar to those shown in Fig. 1, are disposed at the side of each other. Each of these containers has the drum C but the float G and the valve arrangement connected with the float is provided in the first container only.

The pipe 33 has one end threaded into the boss 17 on the drum of the first container and the other end 34 extends into and nearly to the bottom of the middle or intermediate container and is open and perforated as shown. The pipe 35 has one end thereof threaded into the boss 17 on the drum of the middle container and the end 36 thereof extends into and nearly to the bottom of the last container and is open and perforated as shown.

The pipe 21 is threaded into the boss 17 on the drum of the last container and extends to the reducer E as in Fig. 1. The pipe 19 is threaded into the boss 16 on the drum of the first container and serves the same purpose as the pipe 19 in Fig. 1. The pipe 14 is threaded into the cap 12 on the first container and extends to the pump B as in Fig. 1.

In this arrangement, one end of the pipe 39 is threaded into the cap 12 on the last container and is in communication with the interior thereof, the other end is threaded into the cap 12 on the first container and is in communication with the interior thereof, and the middle portion is in communication with the interior of the middle container.

The drain valve 40 is provided on the end of the pipe 39 so that the entire apparatus can be drained when desired and the check valve 37 is provided in the pipe 14 to prevent substance in the container from entering the pump B.

The valve 38 is introduced in the pipe 39 between the first and the middle containers and the valve 41 is introduced in the pipe 39 between the middle and the last container.

In this instance, the deflective-surface-material is the sand I which is promiscuously placed in the containers.

In this arrangement, the carburation air enters the apparatus through the pipe 14 leading into the first container, carburation is effected in this first container and carbureted mixture collects in the drum on the first container in a manner explained in connection with Fig. 1.

The mixture in the drum on the first container then leaves the drum through the pipe 33 and travels into and through the pipe 34 and discharges into the bottom of the middle container whereupon a second carburation operation, similar to the operation in the first container, is performed and the then formed mixture collects in the drum on the middle container.

The mixture in the drum on the middle container then leaves this drum through the pipe 35 and travels into and through the pipe 36 and discharges into the bottom of the last container whereupon a third carburation operation, similar to the previous ones, is performed and the then formed mixture collects in the drum on the last container and then leaves the apparatus through the pipe 21.

The primary purpose of the pipe 39 is to equalize the liquid level in the three containers.

It is well known that various mixtures, lean, heavy, or otherwise, are necessary for various purposes. In order to create variation in the mixture, the valves 38 and 41 can be manipulated or opened and closed to various degrees so that the levels in the containers can be adjusted to different heights between themselves or both valves can be shut off completely when a very lean mixture or a more completely mixed mixture is desired, or each valve can be partly shut off to individual degrees to add more or less liquid to the mixture as the same travels through the last two containers. When these valves are so manipulated, to vary the height of the level in the containers, the amount of liquid permitted to travel through the same, in comparison with liquid consumed in the three carburation operations and the weight of the liquid in each container and the pressure of the air in each container, is just sufficient to maintain the height of each liquid level at a desired stage.

This arrangement provides a repeated carburation of the same air and the sand in this apparatus has a better filtering effect than the coarser gravel shown in Figs. 1 and 2 and the deflective effect of the sand granules is not materially different than that of the gravel.

In each of the devices illustrated in the drawing and described in this specification, the air to be carbureted must take a very tortuous path while it is traveling through the carbureting material in the device so that the carbureting material is thoroughly broken up and gasified and thoroughly mixed with the air in gasified form and thereby forms a gas which is free of solid matter and does so in an efficient and economical manner.

I claim:—

1. A carburation apparatus including a tubular container threaded at each end, a drum threaded onto one end of said container, a cap threaded onto the other end of said container, deflective-surface-material in said container, an air inlet pipe threaded into said cap, an inlet pipe threaded into said drum to feed carbureting material into said container, valve means in said drum and operated by the rise and fall of the level of said carbureting material in the container to control the feed of the carbureting material into the container, and an outlet pipe threaded into said drum to lead mixture from said drum.

2. A carburation apparatus including a mixing container opening into an enlarged mixture drum, means for feeding carburation liquid into said container and up to a certain level therein, deflective-surface-material in said container below said level of the liquid, means for feeding carburation gas into the bottom of said container and through said liquid to form a mixture and to move the same into said drum for further mixing, valve means in said drum to control said level of the liquid in the container, and means for leading mixture from said drum.

3. A carburation apparatus including a plurality of carburation elements each having a container and deflective-surface-material therein and an enlarged drum thereon, means for feeding carburation liquid into one of said containers, means for feeding carburation gas into the bottom of said one container to form a primary mixture in said one container and to move the same into the drum thereon to further mix said mixture, means for leading said mixture from said drum into the bottom of one of the others of said containers and through said material therein and into the drum thereon to further mix said mixture.

JOHN CARR.